United States Patent
Son

(10) Patent No.: US 8,305,551 B2
(45) Date of Patent: Nov. 6, 2012

(54) LIQUID CRYSTAL LENS ELECTRICALLY DRIVEN AND STEREOSCOPIC DISPLAY DEVICE USING THE SAME

(75) Inventor: Jung-Eun Son, Seoul (KR)

(73) Assignee: LG Display Co., Ltd., Seoul (KR)

( * ) Notice: Subject to any disclaimer, the term of this patent is extended or adjusted under 35 U.S.C. 154(b) by 190 days.

(21) Appl. No.: 12/943,604

(22) Filed: Nov. 10, 2010

(65) Prior Publication Data

US 2011/0128456 A1    Jun. 2, 2011

(30) Foreign Application Priority Data

Nov. 27, 2009 (KR) .................. 10-2009-0115818

(51) Int. Cl.
    *G02F 1/13* (2006.01)
(52) U.S. Cl. .......................................... 349/200; 349/15
(58) Field of Classification Search .................. None
See application file for complete search history.

(56) References Cited

U.S. PATENT DOCUMENTS 7,697,109 B2 *  4/2010  Yun et al. ................ 349/200

* cited by examiner

*Primary Examiner* — Richard Kim
(74) *Attorney, Agent, or Firm* — Morgan, Lewis & Bockius LLP

(57) ABSTRACT

Disclosed are a liquid crystal lens electrically driven having a pivot function and a stereoscopic display device using the same, the liquid crystal lens electrically driven includes a first substrate provided with plural first lens regions, each of which is provided with plural first electrodes disposed in parallel in a first direction and separated from each other, a second substrate being opposite to the first substrate, and provided with plural second lens regions, crossing the plural first lens regions, each of which is provided with plural second electrodes disposed in parallel in a second direction crossing the first direction and separated from each other, a liquid crystal layer filling a space between the first and second substrates, first and second voltages source applying different voltage values to the plural first and second electrode, and third and fourth voltage sources applying the same voltage to the plural first and second electrodes.

11 Claims, 7 Drawing Sheets

LIQUID CRYSTAL LENS ELECTRICALLY DRIVEN AND STEREOSCOPIC DISPLAY DEVICE USING THE SAME

This application claims the benefit of Korean Patent Application No. 10-2009-0115818, filed on Nov. 27, 2009, which is hereby incorporated by reference as if fully set forth herein.

BACKGROUND OF THE INVENTION

1. Field of the Invention

The present invention relates to a liquid crystal lens electrically driven, and more particularly, to a liquid crystal lens electrically driven having a pivot function and a stereoscopic display device using the same.

2. Discussion of the Related Art

These days, services to achieve high speed data transmission to be established based on high speed data communication networks are developed from a simply listening and speaking service, such as a current phone, toward a watching and listening service, i.e., a multi-media service through a digital terminal processing characters, voices, and images at a high speed, and is expected to be eventually developed toward a hyperspace-type real three-dimensional data communication service, i.e., a realistically and three-dimensionally watching, feeling, and enjoying service beyond time and space.

In general, a three-dimensional image is obtained by a principle of stereo vision through two eyes. Since there is parallax, i.e., a distance of about 65 cm, between two eyes, the left eye and the right eye watch slightly different images due to the positional difference between the two eyes. Such an image difference due to the positional difference between the two eyes is referred to as binocular disparity. Further, a three-dimensional stereoscopic display device enables the left eye to watch only an image corresponding to the left eye and the right eye to watch only an image corresponding to the right eye using the binocular disparity.

That is, the left/right eyes respectively watch different two-dimensional images, and when the two images are transferred to a brain through retinas, the brain correctly combines the two images and reproduces depth perception and realism of an original three-dimensional image. Such ability is usually referred to as stereography (stereoscopy), and a display device to which stereoscopy is applied is referred to as a stereoscopic display device.

Stereoscopic display devices are divided into various types according to components forming a lens implementing a three-dimensional image. For example, a type of a stereoscopic display device in which a lens is formed using a liquid crystal layer is referred to as a liquid crystal lens type electrically driven.

In general, a liquid crystal display device includes two electrodes opposite to each other and a liquid crystal layer formed between the two electrodes, and liquid crystal molecules of the liquid crystal layer are driven by an electric field generated by applying voltage to the two electrodes. The liquid crystal molecules have polarization and optical anisotropy. Here, polarization refers to change in molecular orientation according to an electric field due to concentration of electrons in liquid crystal molecules on both sides of the liquid crystal molecules when the liquid crystal molecules are placed in the electric field. Further, optical anisotropy refers to change of a path or a polarization state of emitted light according to an incidence direction or a polarization state of incident light due to a thin and long structure of the liquid crystal molecules and the above-described molecular orientation of the liquid crystal molecules.

Thereby, the liquid crystal layer represents a transmittance difference due to voltages applied to the two electrodes, and displays an image by varying the difference at respective pixels.

Recently, a liquid crystal lens electrically driven in which a liquid crystal layer serves as a lens using the above characteristics of liquid crystal molecules has been proposed.

That is, a lens controls a path of incident light at respective positions using a transmittance difference between a material forming the lens and air. If the liquid crystal layer is driven by an electric field formed in the liquid crystal layer by applying different voltages to respective positions of the electrodes, light incident upon the liquid crystal layer is changed to different phases at the respective positions, and thus the liquid crystal layer controls the path of the incident light like the actual lens.

Hereinafter, a conventional liquid crystal lens electrically driven will be described with reference to the accompanying drawings.

FIG. 1 is a longitudinal-sectional view illustrating the conventional liquid crystal lens electrically driven, and FIG. 2 is a view illustrating a potential distribution of the liquid crystal lens electrically driven of FIG. 1 after voltage is applied to the liquid crystal lens electrically driven.

As shown in FIG. 1, the conventional liquid crystal lens electrically driven includes a first substrate 10 and a second substrate 20 opposite to each other, and a liquid crystal layer 30 formed between the first substrate 10 and the second substrate 20.

Here, first electrodes 11 separated from each other by a first separation distance are formed on the first substrate 10. In the two neighboring first electrodes, a distance from the center of one first electrode 11 to the center of the other first electrode 11 is referred to as a pitch, and the first electrode 11 having the same pattern is repeated in pitch intervals.

A second electrode 21 is formed on the entire surface of the second substrate 20 opposite to the first substrate 10.

The first and second electrodes 11 and 21 are made of transparent metal. Further, the liquid crystal layer 30 is formed in a separation space between the first and second electrodes 11 and 21, and liquid crystal molecules forming the liquid crystal layer 30 have a potential surface formed in a parabolic shape due to a property reacting according to intensity and distribution of an electric field, and thus has a phase distribution similar to that of the liquid crystal lens electrically driven, as shown in FIG. 2.

Such a liquid crystal lens electrically driven is formed under the condition that high voltage is applied to the first electrodes 11 and the second electrode 21 is grounded. By the above voltage condition, the strongest vertical electric field is formed at the center of the first electrode 11, and the more distant from the first electrode 11, the weaker vertical electric field is formed. Thereby, if the liquid crystal molecules forming the liquid crystal layer 30 has positive dielectric anisotropy, the liquid crystal molecules are arranged according to the electric field such that the liquid crystal molecules are erected at the center of the first electrode 11 and are tilted nearly horizontally as the liquid crystal molecules are distant from the first electrode 11. Therefore, in terms of light transmission, as shown in FIG. 2, an optical path at the center of the first electrode 11 is short, and an optical path increases in length with increasing distance from the first electrode 11. If it is expressed on the phase surface, the liquid crystal lens electrically driven has light transmission effects similar to the lens having a parabolic surface.

Here, the second electrode 21 induces behavior of the electric field formed by the liquid crystal molecules and causes a refractive index of light to spatially form a parabolic function. The first electrode 11 forms an edge region of the lens.

A voltage value applied to the first electrode 11 is high, and thus a vertical electric field is formed between the first electrode 11 and the second electrode 21. As the distance of the vertical electric field from the first electrode 11 increases, the magnitude of the vertical electric field between the first electrode 11 and the second electrode 21 is decreased. In terms of the optical path, the liquid crystal molecules are erected at the center of the first electrode 11 and are disposed nearly horizontally as the liquid crystal molecules are distant from the first electrode 11, and thus the optical path at the center of the first electrode 11 is the shortest and the optical path increases in length with increasing distance from the first electrode 11. Therefore, the liquid crystal modules exhibit an optical path property similar to that of the lens formed in a parabolic shape at the center of the first electrode 11, thus functioning as the liquid crystal lens electrically driven.

As described above, the liquid crystal lens electrically driven is obtained by forming electrodes on both substrates disposed under the condition that a liquid crystal layer is interposed between the two substrates and then applying voltages to the electrodes without a lens having a surface formed in a parabolic shape.

However, the above-described conventional liquid crystal lens electrically driven has problems, as follows.

First, the electrode formed on the lower substrate is formed at only a part of a lens region, and a gentle electric field between a lens edge region corresponding to the electrode and a lens central region with increasing distant from the lens edge region is not formed, but a rapid lateral field is induced, thereby causing the liquid crystal lens electrically driven to have a somewhat distorted phase. Particularly, in the liquid crystal lens electrically driven, as a pitch of lens regions increases, the number of electrodes to which high voltage is applied is greatly small. Therefore, the electric field between the electrode to which the high voltage is applied in the lens region and the opposite substrate is not sufficient, and thus it is increasingly difficult to form a liquid crystal lens electrically driven formed in a gentle parabolic surface having the same effects as an actual lens.

Second, in case of a large size display device, a lens central region being increasingly distant from a lens edge region where the electrode on which high voltage is applied are located scarcely receives effects of the electric field, and thus adjustment of liquid crystal alignment at the lens central region by the electric field is difficult. In some cases, if the adjustment of liquid crystal alignment at the lens central region is impossible or difficult, the obtained liquid crystal lens electrically driven has a discontinuous lens profile, thus being incapable of being used as a lens.

Third, the electrodes of the liquid crystal lens electrically driven are formed in one direction, and thus the lens functions only in one direction. Therefore, if a display panel is rotated by an angle of 90°, the electrodes of the liquid crystal lens electrically driven cannot display a three-dimensional image. Accordingly, an effort to make a liquid crystal lens electrically driven which, even if the display panel is rotated, can function in a rotated direction, and a stereoscopic display device having the above function has been proposed.

SUMMARY OF THE INVENTION

Accordingly, the present invention is directed to a liquid crystal lens electrically driven and a stereoscopic display device using the same.

One object of the present invention is to provide a liquid crystal lens electrically driven in which a Fresnel lens is anisotropically applied within one pitch in order to decrease the thickness of a liquid crystal layer, and a stereoscopic display device using the same.

Another object of the present invention is to provide a liquid crystal lens electrically driven having a pivot function and a stereoscopic display device using the same.

To achieve this object and other advantages and in accordance with the purpose of the invention, as implemented and broadly described herein, a liquid crystal lens electrically driven includes a first substrate provided with a plurality of first lens regions, each of the first lens regions including a plurality of first electrodes disposed in parallel in a first direction and separated from each other; a second substrate being opposite to the first substrate, and provided with a plurality of second lens regions, crossing the plurality of first lens regions, each of the second lens regions including a plurality of second electrodes disposed in parallel in a second direction crossing the first direction and separated from each other, a liquid crystal layer filling a space between the first and second substrates, a first voltage source applying different voltage values to the plurality of first electrodes provided in each first lens region such that the voltage values are gradually increased from the center of each first lens region to the edge of each first lens region, a second voltage source applying different voltage values to the plurality of second electrodes provided in each second lens region such that the voltage values are gradually increased from the center of each second lens region to the edge of each second lens region, and a third voltage source and a fourth voltage source respectively applying the same voltage to the plurality of first electrodes and the plurality of second electrodes.

When a lens is implemented in each of the first lens regions, the first voltage source may be connected to the plurality of first electrodes and the fourth voltage source may be connected to the plurality of second electrodes.

When a lens is implemented in each of the second lens regions, the second voltage source may be connected to the plurality of second electrodes and the third voltage source may be connected to the plurality of first electrodes.

The plurality of first electrodes may include a first group of electrodes formed on the first substrate, and a second group of electrodes formed on a first interlayer dielectric film formed on the first substrate including the first group of electrodes such that the second group of electrodes alternates with the first group of electrodes.

The plurality of second electrodes may include a third group of electrodes formed on the second substrate, and a fourth group of electrodes formed on a second interlayer dielectric film formed on the second substrate including the third group of electrodes such that the fourth group of electrodes alternates with the third group of electrodes.

In another aspect of the present invention, a stereoscopic display device includes a liquid crystal lens electrically driven including a first substrate provided with a plurality of first lens regions, each of which is provided with a plurality of first electrodes disposed in parallel in a first direction and separated from each other, a second substrate being opposite to the first substrate, and provided with a plurality of second lens regions, crossing the plurality of first lens regions, each of which is provided with a plurality of second electrodes disposed in parallel in a second direction crossing the first direction and separated from each other, and a liquid crystal layer filling a space between the first and second substrates, a display panel located under the liquid crystal lens electrically driven to transmit a two-dimensional image signal, and voltage sources including a first voltage source applying different voltage values to the plurality of first electrodes provided in each first lens region such that the voltage values are gradually increased from the center of each first lens region to the edge of each first lens region, a second voltage source applying different voltage values to the plurality of second electrodes provided in each second lens region such that the voltage values are gradually increased from the center of each second lens region to the edge of each second lens region, and a third voltage source and a fourth voltage source respectively applying the same voltage to the plurality of first electrodes and the plurality of second electrodes.

When a lens is implemented in each of the first lens regions, the first voltage source may be connected to the plurality of first electrodes and the fourth voltage source may be connected to the plurality of second electrodes.

When a lens is implemented in each of the second lens regions, the second voltage source may be connected to the plurality of second electrodes and the third voltage source may be connected to the plurality of first electrodes.

The third voltage source may be connected to the plurality of first electrodes and the fourth voltage source may be connected to the plurality of second electrodes so as to emit a two-dimensional image of the liquid crystal panel.

The implementation of the lens in the first lens regions or the implementation of the lens in the second lens regions may be controlled by user random selection. Otherwise, the implementation of the lens in the first lens regions or the implementation of the lens in the second lens regions may be converted into the other lens regions, if a rotating degree of the liquid crystal panel is sensed and thus it is judged that the rotating degree is more than a designated angle.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, with reference to the accompanying drawings, a liquid crystal lens electrically driven and a stereography device using the same in accordance with the present invention will be described in detail.

Figure 1:
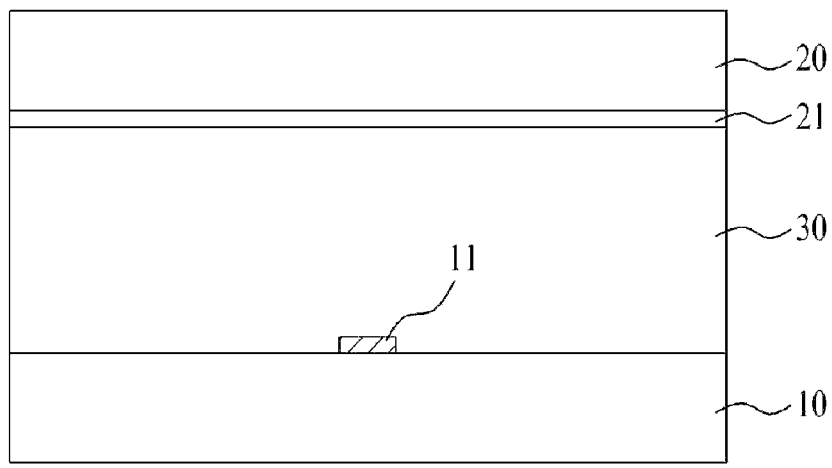
FIG. 1 is a longitudinal-sectional view illustrating a conventional liquid crystal lens electrically driven.
Figure 2:
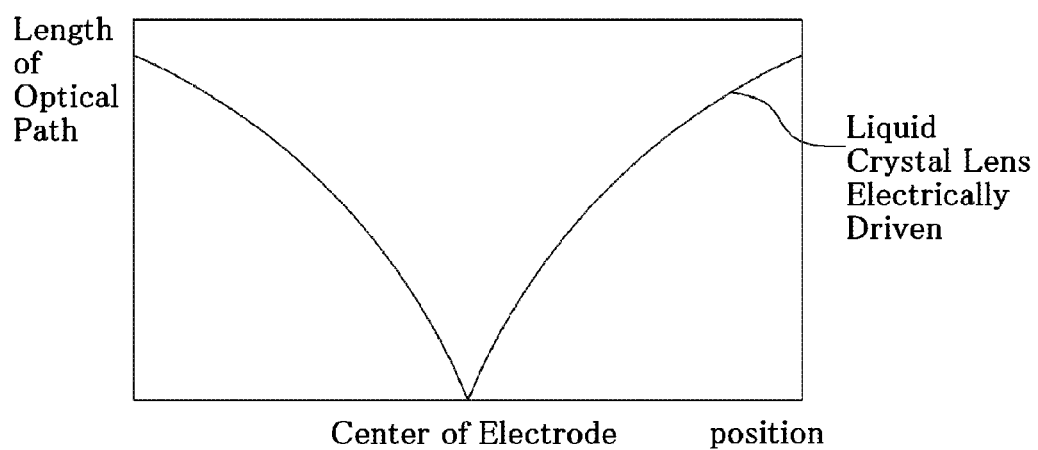
FIG. 2 is a view illustrating a potential distribution of the liquid crystal lens electrically driven of FIG. 1 after voltage is applied to the liquid crystal lens electrically driven.
Figure 3A:
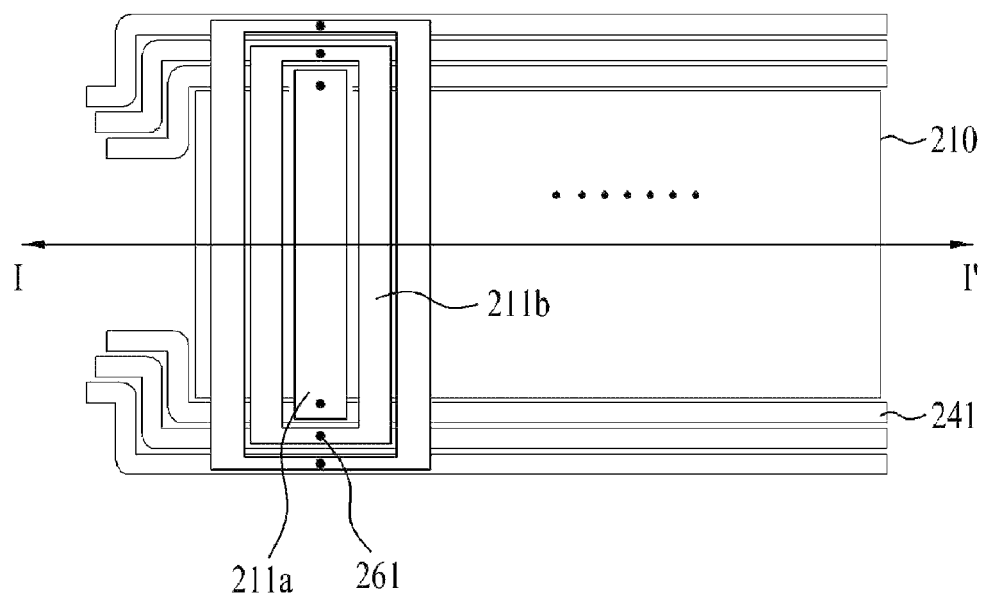
FIG. 3A is a plan view illustrating first electrodes on a first substrate and a voltage applying state thereof in a liquid crystal lens electrically driven in accordance with the present invention.
Figure 3B:
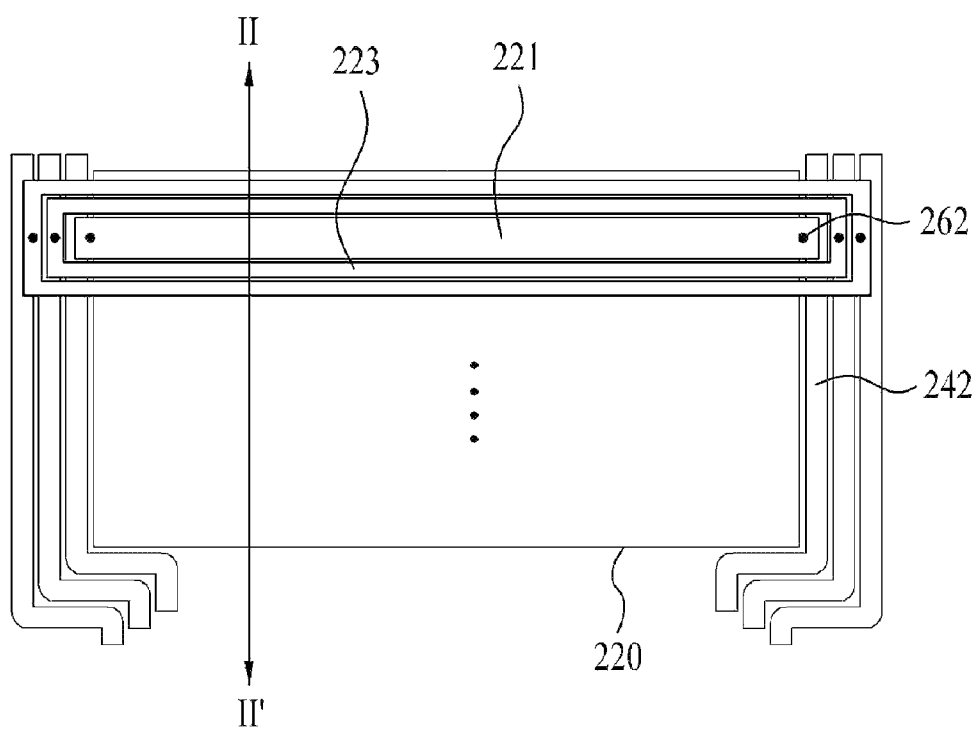
FIG. 3B is a plan view illustrating second electrodes on a second substrate and a voltage applying state thereof in the liquid crystal lens electrically driven in accordance with the present invention.
Figure 4A:
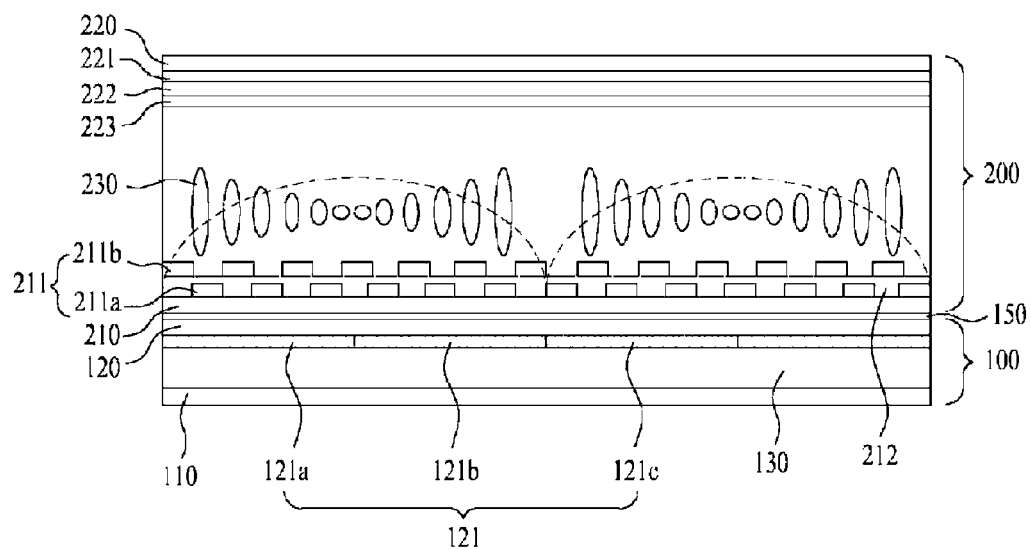
FIG. 4A is a longitudinal-sectional view taken along the line I-I' of FIG. 3A.
Figure 4B:
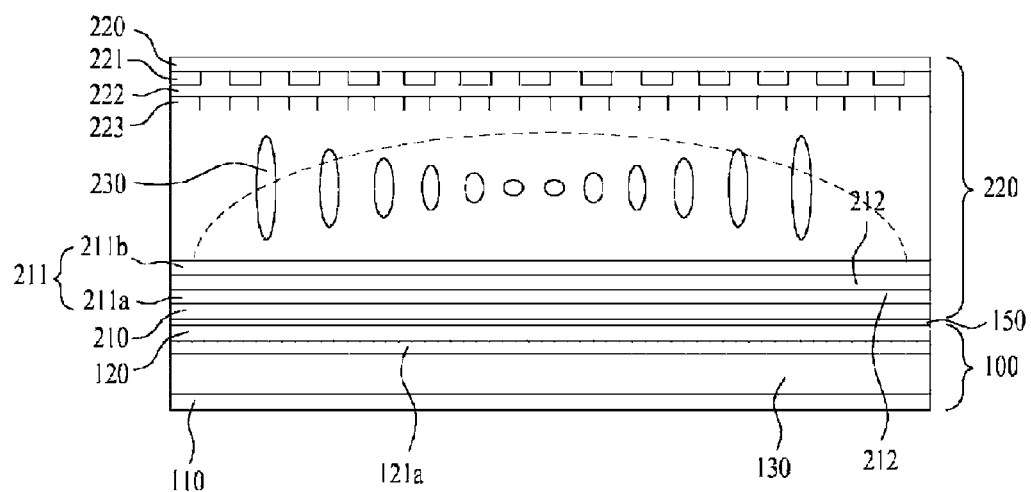
FIG. 4B is a longitudinal-sectional view taken along the line II-II' of FIG. 3B.

FIG. 3A is a plan view illustrating first electrodes on a first substrate and a voltage applying state thereof in a liquid crystal lens electrically driven in accordance with the present invention, FIG. 3B is a plan view illustrating second electrodes on a second substrate and a voltage applying state thereof in the liquid crystal lens electrically driven in accordance with the present invention, FIG. 4A is a longitudinal-sectional view taken along the line I-I' of FIG. 3A, and FIG. 4B is a longitudinal-sectional view taken along the line II-II' of FIG. 3B.

As shown in FIGS. 3A to 4B, a liquid crystal lens 200 electrically driven in accordance with the present invention includes first and second substrates 210 and 220 opposite to each other, a plurality of first electrodes 211*a* and 211*b* and a plurality of second electrodes 221 and 223 formed on the first substrate 210 and the second substrate 220 such that the first electrodes 211*a* and 211*b* and the second electrodes 221 and 223 cross each other, and a liquid crystal layer 230 filling a space between the first and second substrates 210 and 220.

More specifically, a first group of first electrodes 211*a* and a second group of first electrodes 211*b* are located at alternating positions on the first substrate 210, are separated from each other in parallel, and are extended in the same direction. A first interlayer dielectric film 212 is formed between the first group of first electrodes 211*a* and the second group of first electrodes 211*b*.

Further, a first group of second electrodes 221 and a second group of second electrodes 223 are located at alternating positions on the second substrate 220 such that the second electrodes 221 and 223 cross the first electrodes 211*a* and 211*b* at the right angle. In the same manner as the first interlayer dielectric film 212, a second interlayer dielectric film 222 is formed between the first group of second electrodes 221 and the second group of second electrodes 223.

The plural first electrodes 211 have a bar shape, and are formed in the longitudinal direction of the first substrate 210. A width of one first electrode 211: 211*a* or 211*b* is 3~10 μm, and an interval between the neighboring first electrodes 211 is 3~10 μm. For example, a pitch of the first electrodes 211 may be variously changed within the range of 90~1,000 μm. The number of the first electrodes 211 at each lens region may be in the range of about 10 to 100 or more according to the width and the separation interval of the first electrodes 211. In the same manner, a width, an interval, and a pitch of the second electrodes 221 and 223 may be set to ranges similar to those of the first electrodes 211. In general, since panels (first and second substrates) of the liquid crystal lens electrically driven have different transversal and longitudinal widths and the longitudinal width is generally smaller than the transversal width, the number of the pitches between the second electrodes 221 and 223 on the second substrate 220 or the number of the second electrodes 221 and 223 in one pitch may be smaller than the number of the pitches between the first electrodes 211 on the first substrate 210 or the number of the first electrodes 211 in one pitch.

Although not shown in the drawings, a seal pattern (not shown) is formed in an outer region (a non-display region including pad parts) of each of the first and second substrates 210 and 220, thus supporting the first and second substrates 210 and 220. Further, the liquid crystal layer 230 between the first and second substrates 210 and 220 is formed in a sufficient thickness by adding a constant margin to the highest height of a parabolic lens in order to form the liquid crystal lens electrically driven having a sufficient phase. In order to stably maintain the thickness of the liquid crystal layer 230, ball spacers or column spacers to support a cell gap between the first and second substrates 210 and 220 may be further provided. In this case, the spacers may be located at positions not distorting the phase of the liquid crystal lens electrically driven.

In this case, as shown in FIGS. 3A and 4A, when landscape display is performed (when the display panel has a long axis in the horizontal direction), different voltages are applied to the first electrodes 211a and 211b on the first substrate 210 within one pitch (such that the voltage at the edge of the lens is the greatest and the voltage at the center of the lens is the smallest), and the same voltage is applied to the second electrodes 221 and 223 on the second substrate 220, thereby forming a vertical electric field between the first and second substrates 210 and 220 and obtaining the liquid crystal lens electrically driven having an optical path formed in a parabolic shape in a direction crossing the longitudinal direction of the first electrodes 211a and 211b (with reference to FIG. 4A).

Further, as shown in FIGS. 3B and 4B, when portrait display is performed (when the display panel has a long axis in the vertical direction), different voltages are applied to the second electrodes 221 and 223 on the second substrate 220 within one pitch (such that the voltage at the edge of the lens is the greatest and the voltage at the center of the lens is the smallest), and the same voltage is applied to the first electrodes 211a and 211b on the first substrate 210, thereby forming a vertical electric field between the first and second substrates 210 and 220 in a direction crossing the direction of FIGS. 3A and 4A and obtaining the liquid crystal lens electrically driven having an optical path formed in a parabolic shape in a direction crossing the longitudinal direction of the second electrodes 221 and 223 (with reference to FIG. 4B).

The liquid crystal lens electrically driven in accordance with the present invention has a function of emitting a three-dimensional image signal from a two-dimensional image signal according to a profile of a lens surface, and is located on a display panel (not shown) achieving a two-dimensional image. The liquid crystal lens electrically driven selectively emits the three-dimensional image signal and the two-dimensional image signal according to whether or not voltage is applied thereto. That is, the liquid crystal lens electrically driven has a switching function to perform two-dimensional display when voltage is not applied thereto and to perform three-dimensional display when voltage is applied thereto using a property of transmitting light when voltage is not applied thereto.

Further, in case of emitting the three-dimensional image signal, the liquid crystal lens electrically driven performs both landscape stereoscopic display (in the horizontal direction) and portrait stereoscopic display (in the vertical direction) by adjusting voltage values applied to the first electrodes 211a and 211b and the second electrodes 221 and 223.

The first electrodes 211a and 211b and the second electrodes 221 and 223 are made of transparent metal, thus preventing transmittance loss at positions where the respective electrodes 211a, 211b, 221, and 223 are located.

Figure 5:
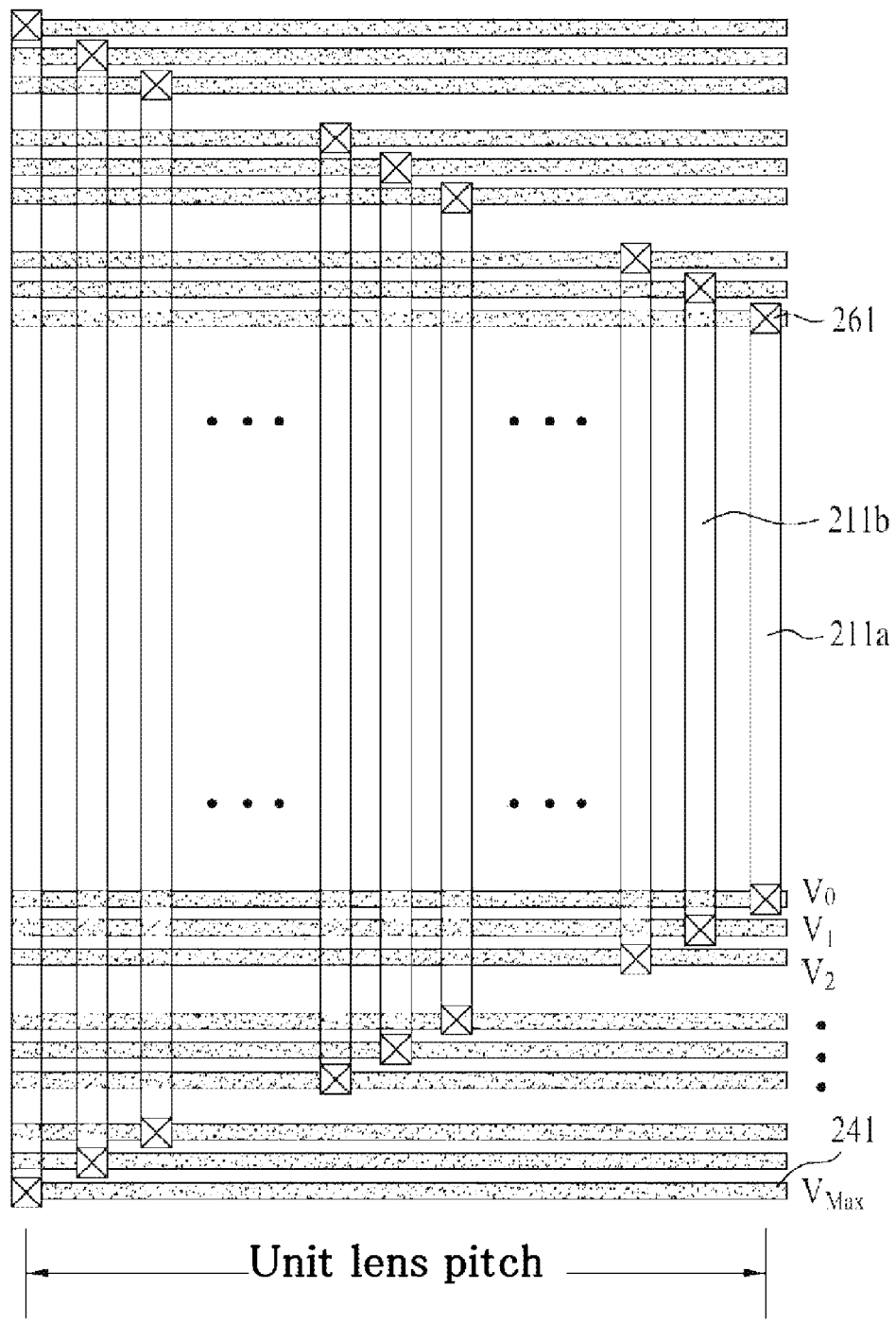
FIG. 5 is a plan view illustrating an electrode distribution in one pitch on the first substrate of FIG. 3A and voltages applied thereto.

FIG. 5 is a plan view illustrating an electrode distribution in one pitch on the first substrate of FIG. 3A and voltages applied thereto.

With reference to FIGS. 5 and 3A, the plural first electrodes 211a and 211b separated from each other in parallel are formed in a unit lens pitch on the first substrate 210 of the liquid crystal lens electrically driven in accordance with the present invention, and both ends of the first electrodes 211a and 211b are connected to metal lines 241, to which different voltages $V_0, V_1, V_2, \ldots V_{max1}$ are applied, through contact holes 261.

With reference to FIG. 3B illustrating voltage application on the second substrate 220, the plural second electrodes 221 and 223 separated from each other in parallel are formed on the second substrate 220, and both ends of the second electrodes 221 and 223 are connected to metal lines 242, to which different voltages $V_0, V_1, V_2, \ldots V_{max2}$ are applied, through contact holes 262.

The unit lens pitches are repeatedly formed on the first substrate 210 and the second substrate 220, and a region defined by each pitch is defined as one lens.

When the landscape display is performed, if the liquid crystal lens electrically driven is formed in the shape of one parabolic lens corresponding to the lens region, first voltage $V_0$ approximately corresponding to threshold voltage is applied to the center of the lens region, and the greatest $n^{th}$ voltage $V_{max1}$ is applied to the first electrode 211a or 211b located at the edge of the lens region. In this case, voltages applied to the first electrodes 211a and 211b located between the center and the edge of the lens region are voltages between the first voltage $V_0$ and the $n^{th}$ voltage $V_{max1}$ such that as the first electrodes 211a are 211b are distant from the center of the lens region, the voltages applied to the first electrodes 211a and 211b are gradually increased. When the voltages are applied to the plural first electrodes 211a and 211b, phase voltage, such as ground voltage or threshold voltage, is applied to all the second electrodes 221 and 223, and thus a vertical electric field is formed between the first electrodes 211a and 211b and the second electrodes 221 and 223.

The plural first electrodes 211: 211a and 211b in the lens region are formed in a bilateral symmetrical structure. The first electrodes 211: 211a and 211b at pad parts thereof (corresponding to a non-display region of the display panel) are electrically connected to corresponding voltage sources $V_0, V_1, V_2, \ldots V_{max1}$ through the contact holes 261.

Here, the smallest threshold voltage $V_0$ applied to the first electrode 211: 211a or 211b is an AC square wave having a peak value of about 1.4~2V, and the threshold voltage $V_0$ is calculated by expression of $$\pi\sqrt{\frac{K1}{\Delta\varepsilon\varepsilon_0}}$$

($\Delta\varepsilon$ is a dielectric anisotropy of liquid crystal, K1 is a modulus of elasticity of liquid crystal, and $\varepsilon_0$ is a dielectric constant of a free space). Further, the greatest $n^{th}$ voltage $V_{max1}$ among the voltages applied to the first electrode 211a or 211b corresponding to the edge of the lens region is an AC square wave having a peak value of about 2.5~10V.

When the landscape display is performed, if the liquid crystal lens electrically driven is formed in the shape of one parabolic lens corresponding to the lens region, voltages applied to the second electrodes 221 and 223 located between the center and the edge of the lens region are voltages between the first voltage $V_0$ and the $m^{th}$ voltage $V_{max2}$ such that as the second electrodes 221 and 223 are distant from the center of the lens region, the voltages applied to the second electrodes 221 and 223 are gradually increased, in the same manner as the above method.

A flat display panel is located under the liquid crystal lens 200 electrically driven. In this embodiment, for example, a liquid crystal panel 100 is located under the liquid crystal lens 200 electrically driven.

Here, the liquid crystal panel 100 includes a first panel substrate 110 and a second panel substrate 120 opposite to each other, a panel liquid crystal layer 130 filling a space between the first and second panel substrates 110 and 120, a thin film transistor (TFT) array (not shown) formed on the first panel substrate 110, and a color filter array including color filters 121: 121a, 121b, and 121c formed on the second panel substrate 120.

In case of the liquid crystal lens electrically driven being cable of performing conversion between the landscape display and the portrait display, different voltages are applied to the first electrodes 211 or the second electrodes 221 and 223 of the liquid crystal lens 200 electrically driven and the same voltage at the level of threshold voltage is applied to the opposite second electrodes 221 and 223 or first electrodes 211 according to rotation of the liquid crystal panel 100 located under the liquid crystal lens 200 electrically driven, thereby forming a vertical electric field suitable to a corresponding lens shape and thus forming the lens in the shape of FIG. 4A or FIG. 4B.

Here, the liquid crystal panel 100 and the liquid crystal lens 200 electrically driven are bonded to each other by a double-sided adhesive layer 150.

Hereinafter, a unit to perform conversion between a landscape display mode and a portrait display mode in the liquid crystal lens electrically driven in accordance with the present invention will be described.

Figure 6:
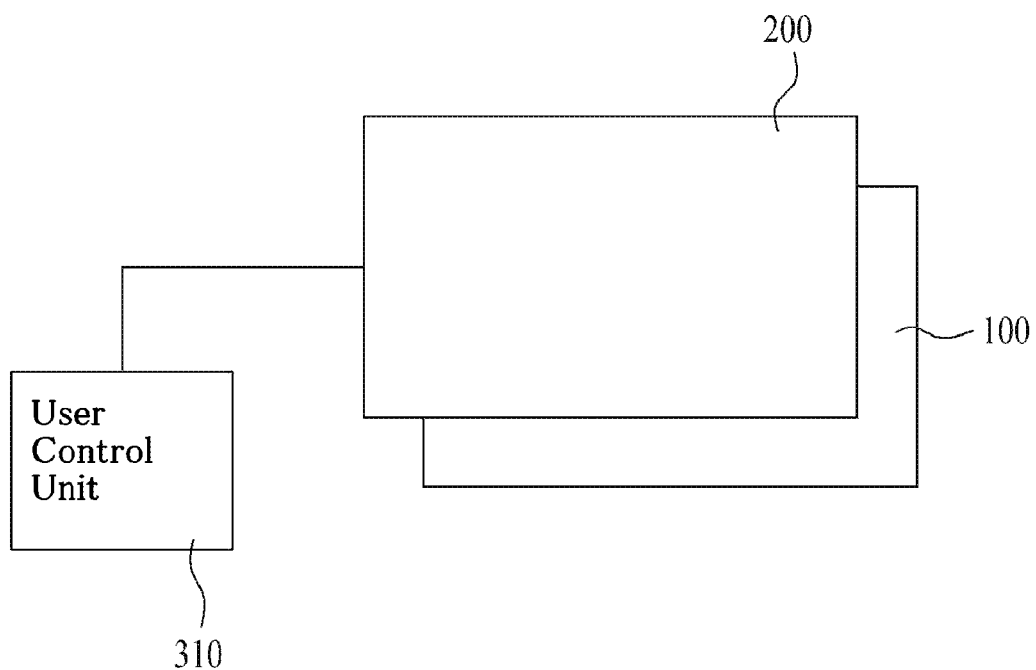
FIG. 6 is a schematic view illustrating a driving method of a stereoscopic display device including the liquid crystal lens electrically driven in accordance with the present invention.

FIG. 6 is a schematic view illustrating a driving method of a stereoscopic display device including the liquid crystal lens electrically driven in accordance with the present invention.

As shown in FIG. 6, a user control unit 310 in a button or key type enabling a user to directly input a control signal from the outside is provided on the liquid crystal lens 200 electrically driven or the liquid crystal panel 100, and the liquid crystal lens 200 electrically driven performs conversion between the landscape display mode and the portrait display mode by applying a signal to the user control unit 310.

Figure 7:
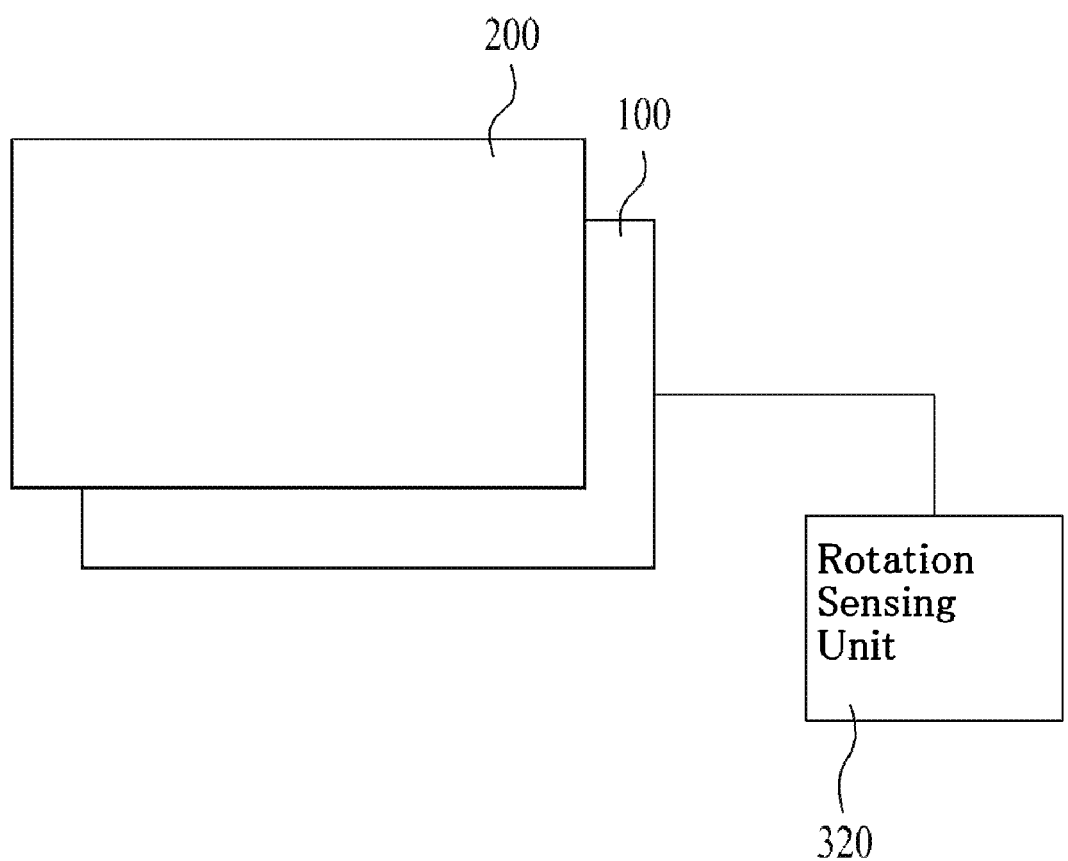
FIG. 7 is a schematic view illustrating a driving method of a stereoscopic display device in accordance with another embodiment of the present invention.

FIG. 7 is a schematic view illustrating a driving method of a stereoscopic display device in accordance with another embodiment of the present invention.

As shown in FIG. 7, in the driving method of the stereoscopic display device in accordance with this embodiment, a rotation sensing unit 320 including a sensor to sense rotation of the liquid crystal panel 100 is provided on the liquid crystal panel 100, the liquid crystal lens 200 electrically driven, or an implement unit (not shown) connected to the liquid crystal panel 100. The rotation sensing unit 320 judges a rotating amount of the liquid crystal panel 130, if the rotating amount is more than a designated level (for example, 45°), to be a conversion signal, and then converts the portrait display mode into the landscape display mode or the landscape display mode into the portrait display mode.

In this case, the sensor judges a tilting degree of the liquid crystal panel 100 relative to a designated axis.

Various applications of a portable display device to mobile phones, PDAs, and game machines have been developed.

Therefore, development of the corresponding applications of a portable display device having a stereoscopic display function is required now, and thus an effort to apply three-dimensional display to a portable display device capable of performing conversion between the landscape mode and the portrait mode has been proposed.

The liquid crystal lens electrically driven in accordance with the present invention senses user selection or a rotating amount a display panel relative to a designated axis according to rotation of the display panel, and performs conversion between the landscape mode and the portrait mode. For this reason, the first electrodes 211: 211a and 211b formed on the first substrate 210 and the second electrodes 221 and 223 formed on the second substrate 220 are disposed so as to cross each other, and different voltages are applied to the first electrodes 211: 211a and 211b or the second electrodes 221 and 223 according to a lens direction to be achieved.

The above-described liquid crystal lens electrically driven and stereoscopic display device using the same in accordance with the present invention has the following effects.

In case of a general liquid crystal lens electrically driven, electrodes on a lower substrate are formed in one direction, one electrode is formed throughout an upper substrate, and the lens is implemented only in one direction, thereby being capable of displaying an image only in one mode, i.e., the landscape mode or the portrait mode. However, in case of the liquid crystal lens electrically driven in accordance with the present invention, a plurality of first electrodes and a plurality of second electrodes are formed on both substrates such that the first electrodes formed on one substrate and the second electrodes formed on the other substrate cross each other, and if a lens region is implemented in the landscape mode, different voltages are applied to the first electrodes and the same voltage is applied to the second electrodes, and if the lens region is implemented in the portrait mode, different voltages are applied to the second electrodes and the same voltage is applied to the first electrodes, thereby achieving a pivot function.

Therefore, for example, if the stereoscopic display device is used as a portable display device, a screen of the stereoscopic display device is converted into a landscape-mode screen while watching DMB, and is converted into a portrait-mode screen while receiving a phone call/message.

It will be apparent to those skilled in the art that various modified embodiments and variations can be made in the present invention without departing from the spirit or scope of the inventions. Thus, it is intended that the present invention covers the modified embodiments and variations of this invention provided they come within the scope of the appended claims and their equivalents.

What is claimed is:

1. A liquid crystal lens electrically driven comprising:
 a first substrate provided with a plurality of first lens regions, each of the first lens regions including a plurality of first electrodes disposed in parallel in a first direction and separated from each other;
 a second substrate being opposite to the first substrate, and provided with a plurality of second lens regions, crossing the plurality of first lens regions, each of the second lens regions including a plurality of second electrodes disposed in parallel in a second direction crossing the first direction and separated from each other;
 a liquid crystal layer filling a space between the first and second substrates;

a first voltage source applying different voltage values to the plurality of first electrodes provided in each first lens region such that the voltage values are gradually increased from the center of each first lens region to the edge of each first lens region;

a second voltage source applying different voltage values to the plurality of second electrodes provided in each second lens region such that the voltage values are gradually increased from the center of each second lens region to the edge of each second lens region; and a third voltage source and a fourth voltage source respectively applying the same voltage to the plurality of first electrodes and the plurality of second electrodes.

2. The liquid crystal lens electrically driven according to claim 1, wherein, when a lens is implemented in each of the first lens regions, the first voltage source is connected to the plurality of first electrodes and the fourth voltage source is connected to the plurality of second electrodes.

3. The liquid crystal lens electrically driven according to claim 1, wherein, when a lens is implemented in each of the second lens regions, the second voltage source is connected to the plurality of second electrodes and the third voltage source is connected to the plurality of first electrodes.

4. The liquid crystal lens electrically driven according to claim 1, wherein the plurality of first electrodes includes:

a first group of electrodes formed on the first substrate; and a second group of electrodes formed on a first interlayer dielectric film formed on the first substrate including the first group of electrodes, wherein the second group of electrodes alternates with the first group of electrodes.

5. The liquid crystal lens electrically driven according to claim 1, wherein the plurality of second electrodes includes:

a third group of electrodes formed on the second substrate; and a fourth group of electrodes formed on a second interlayer dielectric film formed on the second substrate including the third group of electrodes, wherein the fourth group of electrodes alternates with the third group of electrodes.

6. A stereoscopic display device comprising:

a liquid crystal lens electrically driven including:

a first substrate with a plurality of first lens regions, each of the first lens regions having a plurality of first electrodes disposed in parallel in a first direction and separated from each other, a second substrate being opposite to the first substrate, with a plurality of second lens regions, crossing the plurality of first lens regions, each of the second lens regions having a plurality of second electrodes disposed in parallel in a second direction crossing the first direction and separated from each other, and a liquid crystal layer filling a space between the first and second substrates;

a display panel under the liquid crystal lens electrically driven to transmit a two-dimensional image signal; and voltage sources including a first voltage source applying different voltage values to the plurality of first electrodes provided in each first lens region, a second voltage source applying different voltage values to the plurality of second electrodes provided in each second lens region and a third voltage source and a fourth voltage source respectively applying the same voltage to the plurality of first electrodes and the plurality of second electrodes, wherein the voltage values are gradually increased from the center of each first lens region to the edge of each first lens region and wherein the voltage values are gradually increased from the center of each second lens region to the edge of each second lens region.

7. The stereoscopic display device according to claim 6, wherein when a lens is implemented in each of the first lens regions, the first voltage source is connected to the plurality of first electrodes and the fourth voltage source is connected to the plurality of second electrodes.

8. The stereoscopic display device according to claim 6, wherein when a lens is implemented in each of the second lens regions, the second voltage source is connected to the plurality of second electrodes and the third voltage source is connected to the plurality of first electrodes.

9. The stereoscopic display device according to claim 6, wherein the third voltage source is connected to the plurality of first electrodes and the fourth voltage source is connected to the plurality of second electrodes so as to emit a two-dimensional image of the liquid crystal panel.

10. The stereoscopic display device according to claim 6, wherein implementation of the lens in the first lens regions or implementation of the lens in the second lens regions is controlled by user selection.

11. The stereoscopic display device according to claim 6, wherein implementation of the lens in the first lens regions or implementation of the lens in the second lens regions is converted into the other lens regions, by sensing a rotating degree of the liquid crystal panel and judging that the rotating degree is more than a designated angle.

* * * * *